United States Patent [19]

Ettes et al.

[11] Patent Number: 5,736,884
[45] Date of Patent: Apr. 7, 1998

[54] DEVICE FOR GENERATING A CONTROL SIGNAL DEPENDENT ON A VARIABLE RESISTANCE VALUE AND APPARATUS COMPRISING SUCH DEVICE

[75] Inventors: Wilhelmus G. M. Ettes; Peter S. Viet; Johannes De Wit, all of Drachten, Netherlands

[73] Assignee: U.S. Philips Corporation, New York, N.Y.

[21] Appl. No.: 601,927

[22] Filed: Feb. 15, 1996

[30] Foreign Application Priority Data

Feb. 16, 1995 [EP] European Pat. Off. .............. 95200370

[51] Int. Cl.⁶ .......................... H02M 3/335; H03K 5/01
[52] U.S. Cl. .......................... 327/304; 327/190; 327/168; 327/300
[58] Field of Search .......................... 327/103, 165, 327/168, 175, 177, 178, 181, 190, 300, 304, 531, 187, 510; 363/21

[56] References Cited

U.S. PATENT DOCUMENTS

| | | | |
|---|---|---|---|
| 4,052,623 | 10/1977 | Loberg | 327/190 |
| 4,297,595 | 10/1981 | Huellwegen | 327/168 |
| 4,584,635 | 4/1986 | MacInnis et al. | 363/25 |
| 4,709,161 | 11/1987 | Mizohata et al. | 323/289 |
| 4,791,546 | 12/1988 | Carroll | 363/21 |
| 5,003,451 | 3/1991 | Gradl et al. | 363/21 |
| 5,181,170 | 1/1993 | Huang et al. | 363/21 |
| 5,517,089 | 5/1996 | Ravid | 315/307 |

Primary Examiner—Timothy P. Callahan
Assistant Examiner—Terry L. Englund
Attorney, Agent, or Firm—Ernestine C. Bartlett

[57] ABSTRACT

A device for generating a control signal voltage which is dependent on a resistance value of a variable resistor (8) includes a transformer (24) having a first winding (22) which is in series with the variable resistor and a rectifier diode (20). A current generator (32) coupled to a power source is coupled to a second winding (26) of the transformer and supplies it with a periodically interrupted current ($I_2$). Upon each such interruption an exponentially decreasing current will flow through the first winding and also through the variable resistor (8). The peak value of the voltage drop produced by such current across that resistor is proportional to the resistance value thereof. It is also produced across the first winding (22) and is detected by the peak detector (62). That constitutes the control voltage ($U_c$). Since the variable resistor is fully electrically isolated from the power source, it can be safely touched without shock hazard.

36 Claims, 6 Drawing Sheets

DEVICE FOR GENERATING A CONTROL SIGNAL DEPENDENT ON A VARIABLE RESISTANCE VALUE AND APPARATUS COMPRISING SUCH DEVICE

BACKGROUND OF THE INVENTION

1. Field of the Invention

The invention relates to a device for generating a control signal voltage which depends on the resistance value of a variable resistor by producing a current flow through the variable resistor.

The invention also relates to an electrical apparatus comprising such a device.

2. Description of the Related Art

Such a device is known inter alia from mains-synchronous trigger circuits, such as TDA 1024, for control of triacs and thyristors in power control circuits of mains-powered motors, heating elements and the like.

Figure 1:
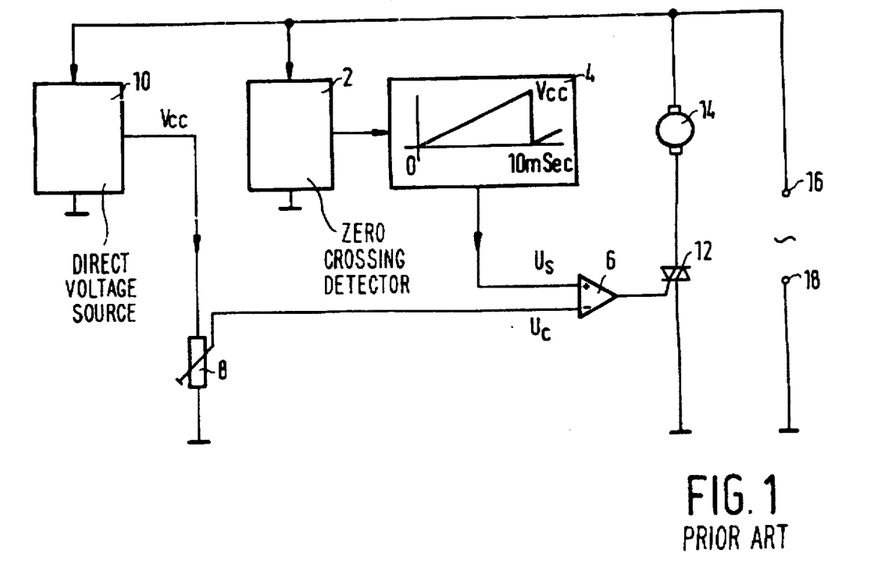
FIG. 1 shows a prior-art triac control.

FIG. 1 shows a known circuit of such a triac control for a series motor of, for example, a vacuum cleaner. The power is controlled by phase control of the triac. The circuit comprises a zero-crossing detector 2, a sawtooth generator 4, which is reset by the zero-crossing detector 2 upon each zero crossing of the applied mains voltage, a comparator 6, which compares the sawtooth voltage $U_s$ from the sawtooth generator 4 with a control voltage $U_c$, which is adjusted by means of a variable resistor 8, in the present case a potentiometer, connected to a direct voltage Vcc supplied by a direct voltage source 10. The comparator 6 drives the gate electrode of a triac 12, which in series with a motor 14 is connected to the mains voltage terminals 16 and 18, of which one terminal is connected to signal ground. The voltage at the wiper of the variable resistor 8 is adjustable between 0 and Vcc. The sawtooth voltage $U_s$ is reset to 0 V upon each zero crossing and subsequently increases linearly. After one mains half-cycle the sawtooth voltage $U_s$ is equal to Vcc. As soon as the sawtooth voltage $U_s$ exceeds the control voltage $U_c$, the output of the comparator 6 goes high and the triac 12 is fired. Since the maximum voltage value of the sawtooth voltage $U_s$ is equal to the maximum value Vcc to which the control voltage $U_c$ can be adjusted, the mains half-cycle can be adjusted to any phase angle between 0 and 180 degrees by means of the variable resistor 8. This known trigger circuit is very suitable inter alia for vacuum cleaners, where power control is effected by means of a variable resistor on the canister.

In order to increase the ease of operation the variable resistor 8 is mounted in the handle of the vacuum-cleaner hose of certain vacuum cleaners. Two connecting wires provided in the hose form the electrical connection between the variable resistor in the handle and the triac control in the canister. Since the hose is rotatably coupled to the canister two sliding contacts are needed to couple the connecting wires to the canister. It should not be possible to touch these sliding contacts because they are electrically connected to the high mains voltage. The safety requirements restrict the design freedom of these sliding contacts. The variable resistor in the handle is also connected to the mains voltage and here the construction should also meet the safety requirements.

When certain safety requirements need no longer be met a greater freedom in the design is achieved and a cost reduction is possible. For a vacuum cleaner this enables the use of simpler and cheaper couplings between the canister and the hose and, in addition, the safety requirements for the wiring in the hose can be much less stringent.

SUMMARY OF THE INVENTION

An object of the invention is to make the device with the variable resistor defined, as in the opening paragraph, safe to touch. To this end, according to the invention, said device is characterized in that the device comprises:

- a transformer having a first winding and a second winding;
- a rectifier diode, which forms a series arrangement with the first winding;
- means for connecting the variable resistor to the series arrangement;
- a current generator coupled, to a terminal, of the second winding to supply to the second winding a periodically interrupted current, the rectifier diode being rendered conducting upon each interruption of such current; and
- the peak detector for detecting the peak value of the voltage generated across the first winding upon interruption of the in the second winding current.

By means of the device in accordance with the invention the resistance value of the variable resistor is determined indirectly by means of a transformer. The variable resistor is included in a circuit connected to a separate winding of a Safety Isolating Transformer. The voltage across this separate winding is so low (Safety Extra Low Voltage) and the isolation of this winding is so good that anything connected to this winding is safe to touch. An advantage of this is that certification authorities impose considerably less stringent or even no electrical safety requirements at all on the touch protection of said sliding contacts and of all the parts, such as the hose and the handle, to be connected to these contacts. Similar advantages also apply to other mains-powered domestic appliances, such as sun-tanning apparatus, hair drying hoods, massaging apparatus and the like, which can be remote-controlled.

The current generator supplies current pulses of given amplitude to the second winding of the transformer. As soon as the current pulse ceases the voltage across the first winding changes over and renders the rectifier diode conductive. As a result of the magnetic coupling between the second winding and the first winding the peak current in the second winding is transferred to the first winding. This peak current flows through the variable resistor via the rectifier diode and produces across the variable resistor a peak voltage which is proportional to the resistance of the variable resistor. Subsequently, the voltage across the variable resistor decreases exponentially with a time constant dictated by the inductance of the first winding and by the resistance of the variable resistor. The peak voltage across the variable resistor is measured by a peak detector, which converts the peak voltage into the desired control signal. An advantage of the device for converting a resistance value of a variable resistor into a control signal voltage is that the magnetisation inductance of the transformer does not play a part in the conversion. Therefore, the transformer can be light and small. Another advantage of the device in accordance with the invention is that the device can be used with only a slight adaptation of existing known electronic circuitry, for example that shown in FIG. 1.

An embodiment of the device in accordance with the invention is characterized in that the transformer further has a third winding to which the peak detector is connected. As a result of the magnetic coupling between the first and the third winding a voltage is available across the third winding, which voltage depends on the winding ratio and is proportional to the voltage across the variable resistor but which is fully electrically isolated from the last-mentioned voltage.

An alternative embodiment of the device in accordance with the invention is characterized in that the peak detector is connected to the terminal of the second winding connected to the current generator. In that case an additional third winding is not necessary but, on the other hand, the value of the supply voltage to which the current generator and the second winding are connected affects the control voltage. However, the tolerance on the supply voltage can be low by taking appropriate steps.

For the peak detector a variety of circuits which are known per se may be used. For this purpose, an embodiment of the device in accordance with the invention is characterized in that the peak detector comprises a series arrangement of a diode and a hold capacitor. Such a peak detector is not only very simple but also has the advantage that the voltage drop across the diode of the peak detector compensates for the voltage drop across the rectifier diode.

Particularly when used in vacuum cleaners the connecting wires between the first winding and the variable resistor may be comparatively long and give rise to parasitic capacitances and inductances. Since the current through the variable resistor, and hence the current through the connecting wires in the hose, has a pulsating exponentially falling shape with a rapidly rising edge, the parasitic capacitances and inductances may give rise to oscillations. As a result of these oscillations the peak detector no longer measures the pure peak value of the voltage across the variable resistor but the peak value of the pure voltage plus the oscillations superposed on it. In order to solve this problem an embodiment of the device in accordance with the invention is characterized in that the device further comprises a capacitor arranged in parallel with the series arrangement of the rectifier diode and the first winding. The capacitor in conjunction with the rectifier diode forms a smoothed direct voltage which is loaded by the variable resistor. The magnitude of the direct voltage depends on the resistance value of the variable resistor and is reflected to the peak detector in the flyback interval, i.e. when the current through the second winding is interrupted. For the rest the measurement by means of the peak detector remains the same. An additional advantage is that a variable resistor having a high resistance can be used. Since owing to the presence of the capacitor the voltage across the variable resistor and the connecting wires is a direct voltage instead of a pulsating voltage, the parasitic capacitances and inductances no longer play a part.

As a result of the provision of the capacitor the relationship between the voltage across the capacitor, and consequently the control signal voltage obtained by the peak detector, and the resistance of the variable resistor will no longer be linear. That which is not a problem for most control purposes. However, the voltage across the capacitor will also be dependent on parameters which are susceptible to spread, such as the supply voltage, the inductance of the second winding of the transformer, the switching frequency or the duty cycle and the peak current of the current generator. In order to preclude this susceptibility to spread an embodiment of the device in accordance with the invention is characterized in that it further comprises a clamp circuit which is adjustable by means of the variable resistor, in order to limit the voltage appearing across the capacitor.

Thus, the direct voltage across the capacitor is forced to a value which is still determined by the value of the variable resistor but which no longer depends on said parameters which are susceptible to spread. An additional advantage is that it is no longer necessary to generate an accurate peak current by means of the current generator as long as the clamp circuit receives enough bias current to allow it to operate correctly. Since neither the switching frequency nor the duty cycle play a part it suffices to use a simple oscillator having a fixed duty cycle, which is a function which can readily be performed by a microcontroller.

Clamping can be effected in various manners. In this respect, an embodiment of the device in accordance with the invention is characterized in that the adjustable clamp circuit comprises a zener diode and a transistor having a main current path, in series with the zener diode, connected across the capacitor, and having a control electrode connected to a voltage divider comprising two resistors, one of which is the variable resistor, which voltage divider is connected across the capacitor. The variable resistor is traversed by a current which is determined by the sum of the zener voltage and the junction voltage of the transistor. The spread in this sum voltage and the current consumption of this clamp circuit may be too large for certain purposes. In order to allow for this, another embodiment of a device in accordance with the invention is characterized in that the adjustable clamp circuit comprises a Programmable Precision Reference having a main current path connected across the capacitor and having a reference electrode connected to a voltage divider comprising two resistors, one of which is the variable resistor, which voltage divider is connected across the capacitor. Such a Reference behaves as an accurate zener diode having a zener voltage determined by an external voltage at the reference electrode.

In general, the device in accordance with the invention for generating a control signal voltage which depends on the resistance value of a variable resistor is suitable for a mains-powered electrical apparatus comprising a first functional unit and a second functional unit cooperating therewith, such device the transformer, the current generator and the peak detector are included in the first functional unit, and the variable resistor is included in the second functional unit. The apparatus may be, particularly, a vacuum cleaner, the first functional unit being a canister and the second functional unit being a suction part constructed to be coupled to the canister and having a handle in which the variable resistor is included. The suction part may comprise a hose in which electrical conductors are included, which conductors, at one end, are coupled to the variable resistor and, at the other end, can be coupled electrically to the series arrangement of the rectifier diode and the first winding of the transformer.

An embodiment of an electrical apparatus comprising a device in accordance with the invention is characterized in that the control signal is applied to a control input of a d.c. controlled power controller for controlling the power of a load which can be electrically coupled to the alternating voltage mains.

BRIEF DESCRIPTION OF THE DRAWINGS

These and other aspects of the invention will be described and elucidated with reference to the accompanying drawings, in which.

DESCRIPTION OF THE PREFERRED EMBODIMENTS

In these Figures items or parts having the same function or purpose bear the same reference symbols.

Figure 2:
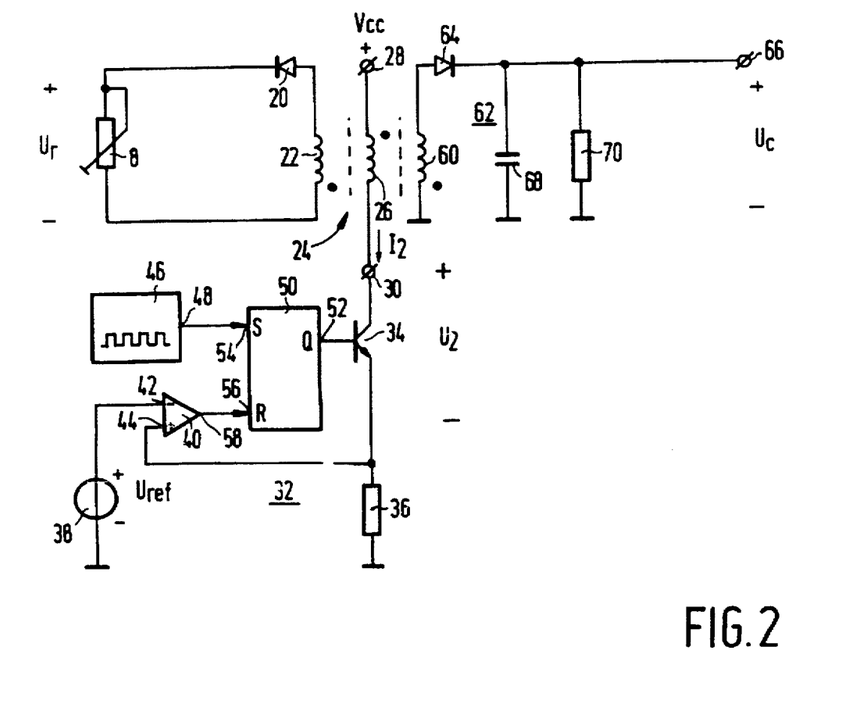
FIG. 2 shows a device for generating a control signal dependent on a resistance value of a variable resistor in accordance with the invention.
Figure 3:
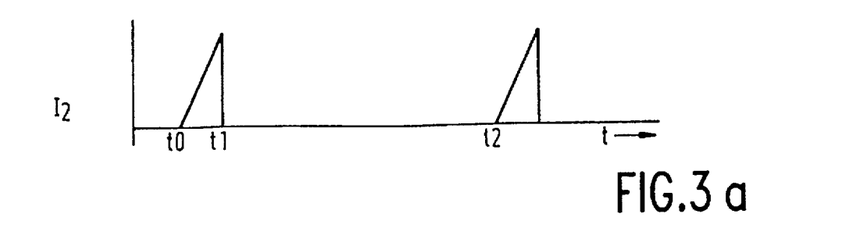
FIG. 3a–3d shows waveforms of signals appearing in the device shown in FIG. 2.

FIG. 2 shows the circuit diagram of an embodiment of a device for generating a control signal voltage dependent on the a resistance value of a variable resistor. The variable resistor 8 is connected to a first winding 22 of a transformer 24 via a rectifier diode 20. A second winding 26 of the transformer 24 is connected between a positive supply terminal 28 and a terminal 30 to which a current generator 32 is connected. The current generator 32 comprises an NPN switching transistor 34 having its collector connected to the terminal 30, a sensing resistor 36 connected between the emitter of the switching transistor 34 and ground, a reference voltage source 38, which supplies a reference voltage Uref relative to ground, a comparator 40, having its inverting input 42 connected to the reference voltage source 38 and having its non-inverting input 44 connected to the sensing resistor 36, a clock pulse generator 46 having an output 48 for supplying clock pulses, and a flip-flop 50 having its Q output 52 connected to the base of the switching transistor 34, its set input 54 to the output 48 of the clock pulse generator 46, and its reset input 56 to the output 58 of the comparator 40. The transformer 24 further comprises a third winding 60, to which the peak detector 62 is connected. The peak detector 62 comprises a diode 64 having its anode connected to one end of the third winding 60 and its cathode to a control voltage terminal 66, a hold capacitor 68 and a resistor 70, which are connected between the control voltage terminal and ground. The other end of the third winding is also connected to ground. Owing to the transformer 24 the variable resistor 8 is fully electrically isolated from the ground of the rest of the circuit. FIG. 3 shows the signals appearing in the circuit of FIG. 2.

At an instant t0 the switching transistor 34 is turned on by a clock pulse from the clock pulse generator 46 at the set input 54 of the flip-flop 50. The voltage across the second winding 26 is then positive and the voltage $U_2$ at the terminal 30 is substantially zero. As a result of the opposite winding direction of the first winding 22, indicated by a dot, the rectifier diode 20 is cut off and the voltage $U_R$ across the variable resistor 8 is zero. The current $I_2$ through the second winding 26 increases linearly from t0 to a peak value determined by the resistance of the sensing resistor 36 and the reference voltage Uref of the reference voltage source 38. When the voltage drop across the sensing resistor 36 exceeds the reference voltage Uref, the output 58 of the comparator 40 goes high, thereby causing the flip-flop 50 to be reset and the switching transistor 34 to be turned off. As a result of the sudden decrease of the current $I_2$ through the second winding the sign of the voltage across the second winding and, consequently, that of the voltage across the first winding 22 is reversed. Now a current will flow through the rectifier diode 20 and the variable resistor 8, the initial value of this current being proportional to the peak value of the current $I_2$ through the second winding 26. The current through the variable resistor 8 and hence the voltage $U_R$ across the variable resistor 8 decrease exponentially with a time constant which depends upon the inductance of the first winding 22 and the resistance value of the variable resistor 8. The magnetic coupling between the third winding 60 and the first winding 22 enables the voltage $U_R$ to be measured by means of the peak detector 62, which generates at the control voltage terminal 66 a control signal voltage $U_c$ which is proportional to the peak value of the voltage $U_c$ across the variable resistor 8. The voltage drop across the rectifier diode 20 in series with the variable resistor 8 is compensated for by the voltage drop across the diode 64 of the peak detector 62. After the current through the variable resistor 8 has decreased to zero the switching transistor 34 is turned on again at a given instant t2 and the cycle repeats itself, so that a substantially continuous control signal voltage $U_c$ is available. The peak voltage across the variable resistor 8 and hence the magnitude of the control signal voltage $U_c$ varies with the resistance setting of the variable resistor 8.

Figure 4:
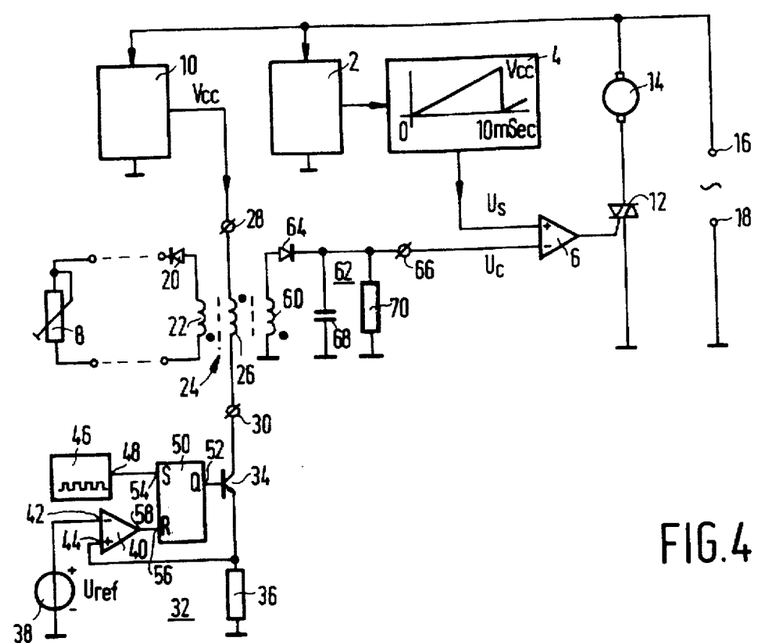
FIG. 4 shows a power control using a triac, including a device for generating a control signal dependent on a resistance value of a variable resistor, in accordance with the invention.

With a minor modification the measurement circuit shown in FIG. 2 can be included in the triac control described hereinbefore with reference to FIG. 1. The result is shown in FIG. 4. This triac control is suitable for controlling the power of, for example, a series motor of a vacuum cleaner. The power is controllable by means of the variable resistor 8, which is electrically isolated from the rest of the triac control, which is connected to the mains voltage.

Figure 5:
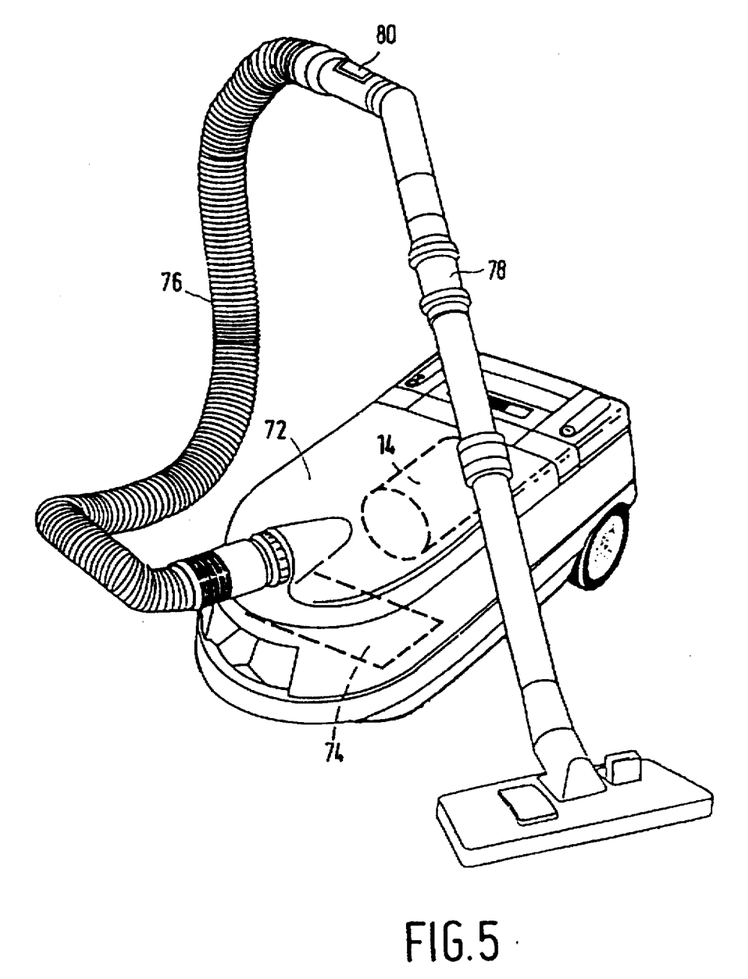
FIG. 5 shows a vacuum cleaner comprising a device for generating control signal dependent on a resistance value of a variable resistor, in accordance with the invention.

FIG. 5 shows a vacuum cleaner comprising the triac control of FIG. 4. The canister 72 accommodates the motor 14 and a printed circuit board 74, which carries the components of the triac control with the exception of the variable resistor 8, which is mounted in the handle 80 of the suction part 78 for greater ease of operation and which is connected via wires, not shown, in the hose 76 of the suction part 78. The canister 72 and the suction part 78 are functional units which cooperate with one another and which can be detached from one another. When the hose 76 is detached from the canister 72 the contacts of the connecting wires in the hose 76 are exposed. Thanks to the total electrical isolation these contacts are safe to touch and no expensive constructions are necessary for the electromechanical coupling between the hose 76 and the canister 72.

Figure 6:
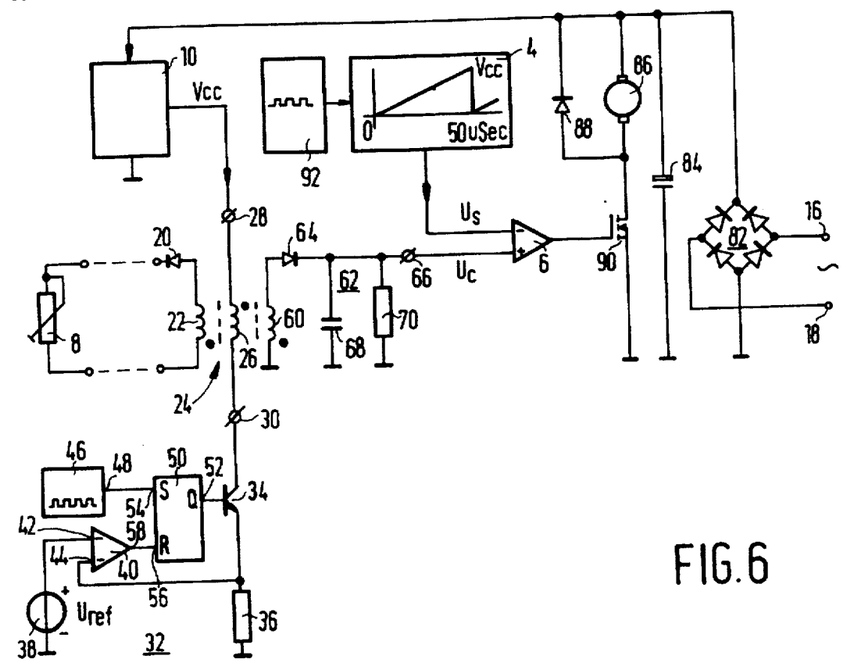
FIG. 6 shows a pulse-width controlled power control including a device for generating a control signal dependent on a resistance value of a variable resistor, in accordance with the invention.

FIG. 6 shows the circuit of a pulse-width controlled power control for a d.c. motor. The circuit arrangement and operation differ only slightly from the triac control shown in FIG. 4. The mains voltage is first rectified with a rectifier bridge 82 and, if desired, smoothed with a smoothing capacitor 84. The d.c. motor 86 is shunted with a freewheel diode 88 and the triac is replaced by an NMOS switching transistor 90 whose gate is controlled by the comparator 6. The sawtooth generator 4 is now controlled by a clock pulse generator 92 having a clock frequency of, for example, 20 kHz. By varying the control voltage $U_c$ by means of the variable resistor 8 the duty cycle of the control pulse at the gate of the switching transistor 90 can be controlled between 0 and 100%.

Figure 7:
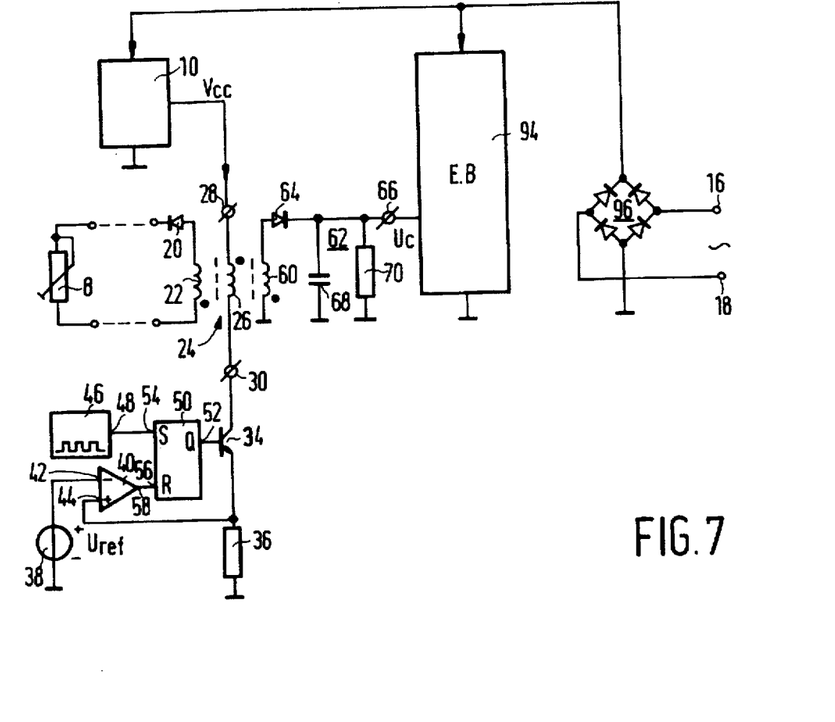
FIG. 7 shows a direct-voltage controlled ballast circuit for lamps, which circuit includes a device for generating a control signal voltage dependent on a resistance value of a variable resistor, in accordance with the invention.

FIG. 7 shows a third use of the device for deriving a control signal dependent on a resistance value of a variable resistor for an electronic ballast 94 which enables the light intensity of lamps (not shown) connected to the electronic ballast to be controlled by means of a d.c. control voltage $U_c$. The ballast is powered from the mains via a rectifier bridge 96, which is connected directly to the mains. Such a circuit can be used in sun-tanning apparatus. In order to increase the ease of operation the variable resistor 8 is accommodated in a remote control device connected to the sun-tanning apparatus by a lead. Thanks to the total electrical isolation the lead can be thin and flexible, because no thick and double insulated connecting wires are needed.

This shows that the device for generating a control signal dependent on a resistance value of a variable resistor has a broad field of use in a variety of mains-powered apparatuses in which the power of a load which is powered directly from the mains can be controlled by means of a variable direct voltage.

In FIGS. 4, 6 and 7 the connecting wires to the variable resistor 8 have been shown in broken lines to indicate that the connection is detachable. When used in a vacuum cleaner, as shown in FIG. 5, the connecting wires may have a considerable length. The parasitic capacitances and inductances of the connecting wires distort the pulse-shaped voltage $U_R$ shown in FIG. 3c. The rapidly rising edge in the voltage $U_R$ may give rise to oscillations. Owing to the oscillations the peak detector 62 will measure the peak value of the sum of the peak value of the voltage $U_R$ and the oscillations superposed on this voltage.

Figure 8:
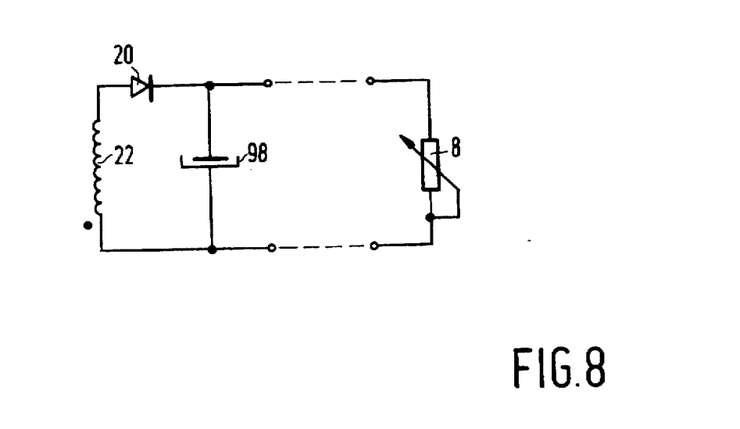
FIG. 8 shows a detail of an alternative embodiment of a device for generating a control signal voltage dependent on a resistance value of a variable resistor, in accordance with the invention.

This can be precluded, as is shown in FIG. 8, by arranging a capacitor 98 across the series arrangement of the rectifier diode 20 and the first winding 22. The variable resistor now acts as a variable load for the direct voltage across the capacitor 98. In the flyback interval t2–t1 (see FIG. 3) this direct voltage is again reflected to the other windings and can be measured in the same manner by means of the peak detector 62. Since the voltage across the connecting wires has now become a direct voltage parasitic oscillations are avoided and long connecting wires can be used.

However, the voltage across the capacitor 98 appears to be dependent on various parameters which are susceptible to spread, i.e. the supply voltage Vcc, the inductance of the second winding 22, the switching frequency or period of the current pulses, and the peak current or duty cycle of the current through the second winding 26. The dependence on all these parameters can be ruled out by clamping, i.e. limiting, the direct voltage across the capacitor 98 to a fixed value which is adjustable by means of the variable resistor 8. In this case it is adequate to use a current generator with a simple oscillator and a fixed duty cycle, which is a function that can also be performed by a microcontroller.

Figure 9:
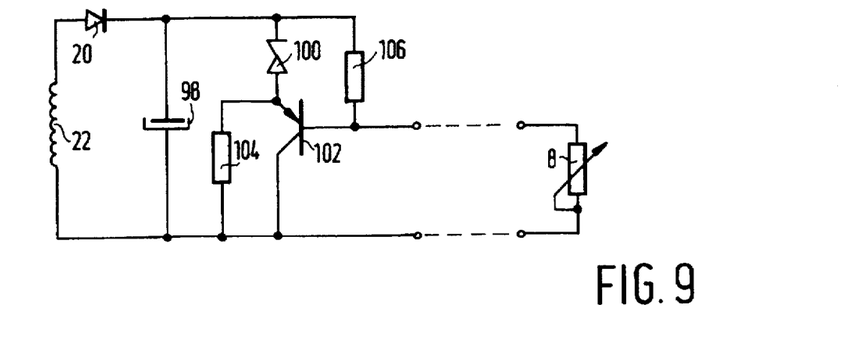
FIG. 9 shows a detail of an alternative embodiment of a device for generating a control signal voltage dependent on a resistance value of a variable resistor, in accordance with the invention.

FIG. 9 shows a first implementation of such a clamp circuit. A series arrangement of a zener diode 100 and the main current path of a PNP transistor 102 is connected across the capacitor 98, which transistor has its emitter connected to the zener diode 100. Moreover, a resistor 104 is connected in parallel with the transistor 102 and ensures a minimum current through the zener diode 100. The base of the transistor 102 is connected to a tap of a voltage divider, which is also connected across the capacitor 98. The voltage divider comprises a resistor 106, which is arranged in parallel with the zener diode 100 and the base-emitter junction of the transistor 102, and the variable resistor 8, which is arranged in parallel with the collector-base junction of the transistor 102. The current through the resistor 106 is constant and is given by the quotient obtained by dividing the sum of the zener voltage of the zener diode 100 and the base-emitter voltage of the transistor 102 by the resistance of the resistor 106. This constant current flows also through the variable resistor 8. The voltage across the capacitor 98 is the sum of the zener voltage of the zener diode 100, the base-emitter voltage of the transistor 102 and the voltage across the variable resistor 8. The clamp circuit of FIG. 9 can also be implemented by means of an NPN transistor instead of a PNP transistor. In that case the zener diode 100 and the resistor 104 should be interchanged. This also applies to the variable resistor 8 and the resistor 106. The collector of the NPN transistor should then be connected to the cathode of the rectifier diode 20, the emitter to the node between the resistor 104 and the zener diode 100, and the base to the node between the variable resistor 8 and the resistor 106.

Figure 10:
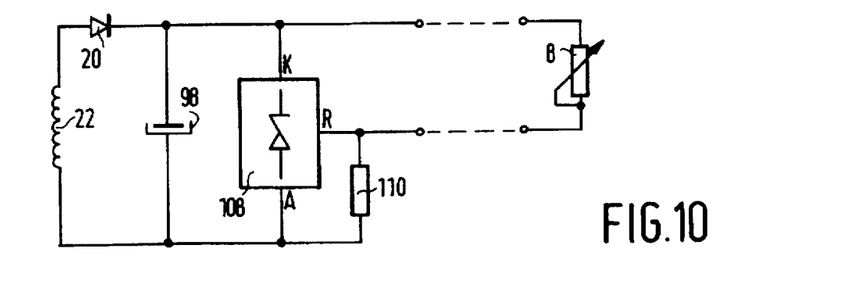
FIG. 10 shows a detail of an alternative embodiment of a device for generating a control signal voltage dependent on a resistance value of a variable resistor, in accordance with the invention.

The spread in the base-emitter voltage of the transistor 102 and the zener voltage of the zener diode 100 may be too large for some purposes. FIG. 10 shows an accurate clamp circuit with a Programmable Precision Reference 108, for example TL 431, whose cathode terminal K is connected to the node between the rectifier diode 20 and the capacitor 98, whose anode terminal A is connected to the node between the capacitor 98 and the first winding 22, and whose reference terminal R is connected to the anode terminal A via a resistor 110 and to the cathode terminal K via the variable resistor 8. The Programmable Precision Reference 108 behaves as a zener diode whose zener voltage is adjustable by means of a voltage at the reference terminal R.

Figure 11:
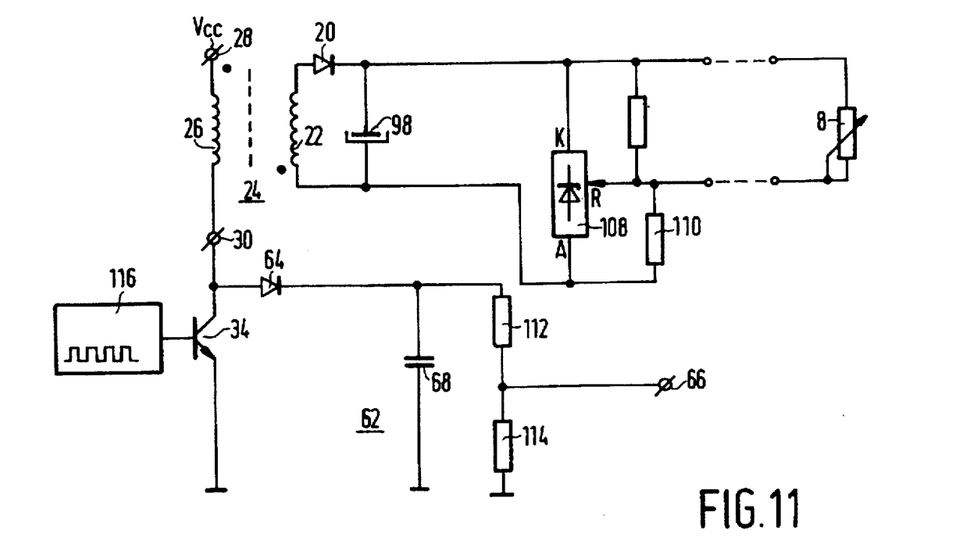
FIG. 11 shows a detail of an alternative embodiment of a device for generating a control signal voltage dependent on a resistance value of a variable resistor, in accordance with the invention.

The third winding 60 of the transformer 24 may be dispensed with when the peak detector 62 is connected to the terminal 30 of the second winding 26, as is shown in FIG. 11. The peak detector 62 now measures the peak value of the voltage $U_2$ (FIG. 3b), in which the supply voltage Vcc at the positive supply terminal 28 occurs. In order to minimise variations in the supply voltage Vcc it is advisable to select the direct voltage across the capacitor 98 to be larger than the supply voltage Vcc. This also results in a larger peak voltage at the terminal 30. By dividing the resistor across the hold capacitor 68 into two resistors 112 and 114 the detected peak voltage can be reduced. The switching transistor 34 receives control pulses from an oscillator 116 which, as already stated, can be simple.

The bipolar transistors shown in the circuit diagrams can be replaced by unipolar MOS transistors. The variants shown in FIGS. 8, 9, 10 and 11 can be used in all the embodiments shown in FIGS. 2, 4, 6 and 7. If desired, the peak detector 62 may be implemented by other circuits or special ICs having the same function or effect.

We claim:

1. A device for generating a control signal voltage ($U_c$) by producing a current through a variable resistor (8), the control signal voltage being dependent on the resistance value of the variable resistor (8); said device comprising:

a transformer (24) having a first winding (22) and a second winding (26);

a rectifier diode (20) in series with the first winding (22);

means for connecting the variable resistor (8) in series with the first winding (22) and the rectifier diode (20) so as to form a closed loop for current flow therein in one direction;

a current generator (32) coupled to the second winding (26) to supply thereto a periodically interrupted current ($I_2$), each interruption thereof inducing a voltage across the first winding (22) which renders said rectifier diode (20) conductive and produces a current flow in said loop through the first winding (22) and the variable resistor (8), said induced voltage having a peak value dependent on the resistance value of the variable resistor (8); and a peak detector (62) for detecting the peak value of the voltage produced across the first winding (22) upon each interruption of the current ($I_2$) in the second winding (26), said detected peak value constituting the control signal voltage ($U_c$).

2. A device as claimed in claim 1, characterized in that the device further comprises a capacitor (98) coupled in parallel to the series combination of the rectifier diode (20) and the first winding (22).

3. A device as claimed in claim 2, characterized in that the device further comprises a clamp circuit which is adjustable by means of the variable resistor (8), in order to limit a voltage appearing across the capacitor (98).

4. A device as claimed in claim 3, characterized in that the adjustable clamp circuit comprises a zener diode (100) and a transistor (102) having a main current path which, in series with the zener diode (100), is connected across the capacitor (98), the transistor (102) having a control electrode connected to a voltage divider formed by two resistors (106, 8), one of which is the variable resistor (8), said voltage driver being also connected across the capacitor (98).

5. A device as claimed in claim 3, characterized in that the adjustable clamp circuit comprises a Programmable Precision Reference (108) having a main current path (A, K) connected across the capacitor (98) and having a reference electrode (R) connected to a voltage divider comprising two resistors (8, 110), one of which is the variable resistor (8), said voltage driver being also connected across the capacitor (98).

6. A device as claimed in claim 1, wherein the transformer (24) has a third winding (60) to which the peak detector (62) is connected and which is electrically separated from the first winding (22) and the second winding (26).

7. A device as claimed in claim 1, wherein the peak detector (62) is connected to a node (30) between the second winding (26) and the current generator (32).

8. A device as claimed in claim 1, wherein the peak detector (62) comprises a series arrangement of a diode (64) and a hold capacitor (68).

9. A device as claimed in claim 1, wherein the current generator (32) comprises:

a switching transistor (34) having a first main electrode connected to a terminal (30) of the second winding (26), a second main electrode, and a control electrode;

a sensing resistor (36) coupled in series with the second main electrode;

a reference voltage source (38);

a comparator (40) having an output (58) and two inputs, of which one input (42) is connected to the reference voltage source (38) and the other input (44) is connected to the sensing resistor (36);

a clock pulse generator (46) having an output for supplying clock pulses; and a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

10. An electrical apparatus comprising a first functional unit (72), a second functional unit (78) cooperating therewith, and the device as claimed in claim 1, for producing the control signal voltage which is dependent on the resistance value of the variable resistor (8) wherein the current generator (32) and the peak detector (62) are included in the first functional unit (72) and the variable resistor (8) is included in the second functional unit (78).

11. An electrical apparatus as claimed in claim 10, characterized in that the apparatus is a vacuum cleaner, the first functional unit being a canister (72) and the second functional unit being a suction part (78) coupled to the canister (72) and having a handle (80) in which the variable resistor (8) is included.

12. An electrical apparatus as claimed in claim 11, characterized in that the suction part (78) comprises a hose (76) in which electrical conductors are included, which conductors, at one end, are coupled to the variable resistor (8) in the handle (80) and, at the other end, coupled electrically to the series arrangement of the rectifier diode (20) and the first winding (22).

13. An electrical apparatus as claimed in claim 10, wherein the control signal voltage ($U_c$) is applied to a control input of a d.c. controlled power controller (2, 4, 6, 12) for controlling the power of a load (14) electrically coupled to alternating voltage mains (16, 18).

14. A device as claimed in claim 2 wherein the transformer (24) has a third winding (60) to which the peak detector (62) is connected and which is electrically separated from the first winding (22) and the second winding (26).

15. A device as claimed in claim 3 wherein the transformer (24) has a third winding (60) to which the peak detector (62) is connected and which is electrically separated from the first winding (22) and the second winding (26).

16. A device as claimed in claim 4 wherein the transformer (24) has a third winding (60) to which the peak detector (62) is connected and which is electrically separated from the first winding (22) and the second winding (26).

17. A device as claimed in claim 5 wherein the transformer (24) has a third winding (60) to which the peak detector (62) is connected and which is electrically separated from the first winding (22) and the second winding (26).

18. A device as claimed in claim 2 wherein the peak detector (62) is connected to a node (30) between the second winding (26) and a current generator (32).

19. A device as claimed in claim 3 wherein the peak detector (62) is connected to a node (30) between the second winding (26) and a current generator (32).

20. A device as claimed in claim 4 wherein the peak detector (62) is connected to a node (30) between the second winding (26) and a current generator (32).

21. A device as claimed in claim 5 wherein the peak detector (62) is connected to a node (30) between the second winding (26) and a current generator (32).

22. A device as claimed in claim 2 wherein the peak detector (62) comprises a series arrangement of a diode (64) and a hold capacitor (68).

23. A device as claimed in claim 3 wherein the peak detector (62) comprises a series arrangement of a diode (64) and a hold capacitor (68).

24. A device as claimed in claim 4 wherein the peak detector (62) comprises a series arrangement of a diode (64) and a hold capacitor (68).

25. A device as claimed in claim 5 wherein the peak detector (62) comprises a series arrangement of a diode (64) and a hold capacitor (68).

26. A device as claimed in claim 6 wherein the peak detector (62) comprises a series arrangement of a diode (64) and a hold capacitor (68).

27. A device as claimed in claim 7 wherein the peak detector (62) comprises a series arrangement of a diode (64) and a hold capacitor (68).

28. A device as claimed in claim 2 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

29. A device as claimed in claim 3 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

30. A device as claimed in claim 4 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

31. A device as claimed in claim 5 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

32. A device as claimed in claim 6 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

33. A device as claimed in claim 7 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

34. A device as claimed in claim 8 wherein the current generator (32) comprises:
- a switching transistor (34) having a first main electrode connected to a terminal (30) of the second winding (26), a second main electrode, and a control electrode;
- a sensing resistor (36) coupled in series with the second main electrode;
- a reference voltage source (38);
- a comparator (40) having an output (58) and two inputs, of which one input (42) is connected to the reference voltage source (38) and the other input (44) is connected to the sensing resistor (36);
- a clock pulse generator (46) having an output for supplying clock pulses; and
- a flip-flop (50) having an output (52) coupled to the control electrode of the switching transistor (34) and having a set input (54) and a reset input (56), one of said inputs being connected to the output of the comparator (40) and the other being connected to the output of the clock pulse generator.

35. An electrical apparatus as claimed in claim 11 wherein the control signal voltage ($U_c$) is applied to a control input of a d.c. controlled power controller (2, 4, 6, 12) for controlling power of a load (14) electrically coupled to the alternating voltage mains (16, 18).

36. An electrical apparatus as claimed in claim 12 wherein the control signal voltage ($U_c$) is applied to a control input of a d.c. controlled power controller (2, 4, 6, 12) for controlling the power of a load (14) electrically coupled to alternating voltage mains (16, 18).

* * * * *